Dec. 16, 1930.                C. D. YOUNG                1,785,169
RAMP RAIL CONSTRUCTION
Filed Jan. 18, 1929          2 Sheets-Sheet 1
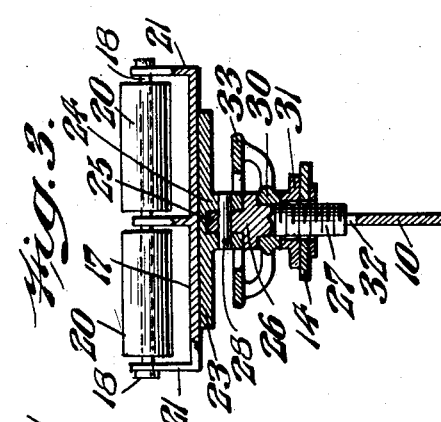
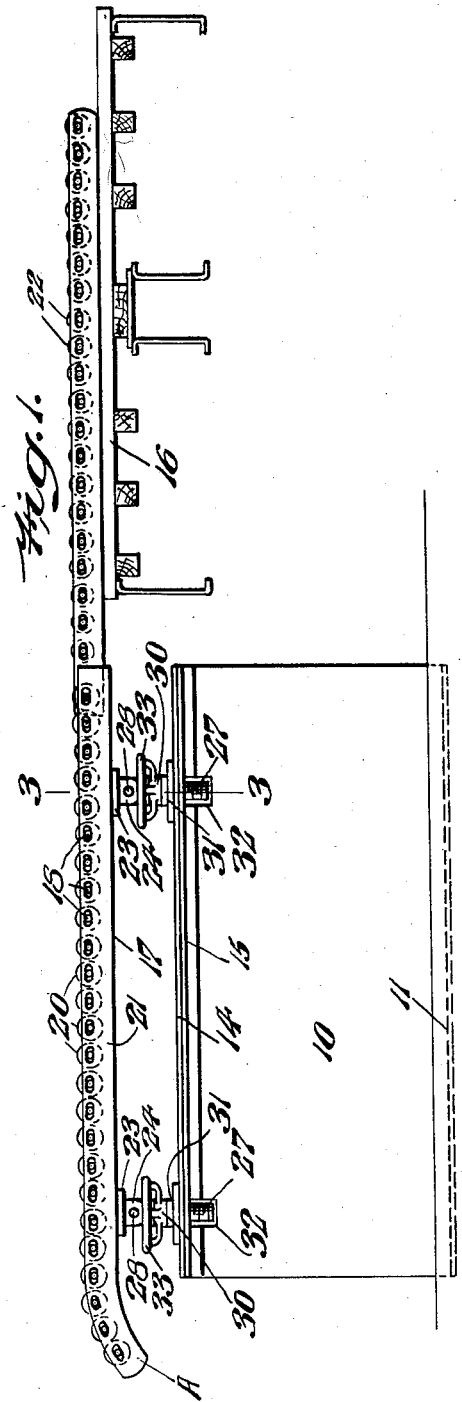
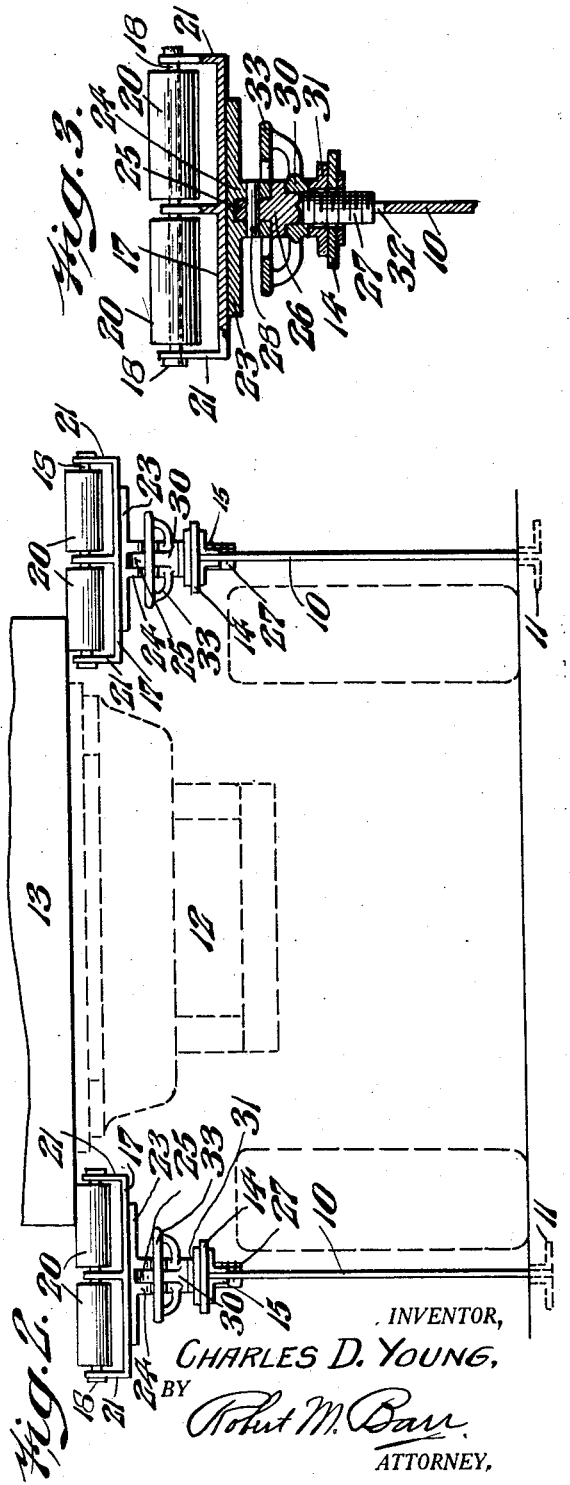
INVENTOR,
CHARLES D. YOUNG,
BY
Robert M. Barr
ATTORNEY.

Dec. 16, 1930.  C. D. YOUNG  1,785,169
RAMP RAIL CONSTRUCTION
Filed Jan. 18, 1929   2 Sheets-Sheet 2
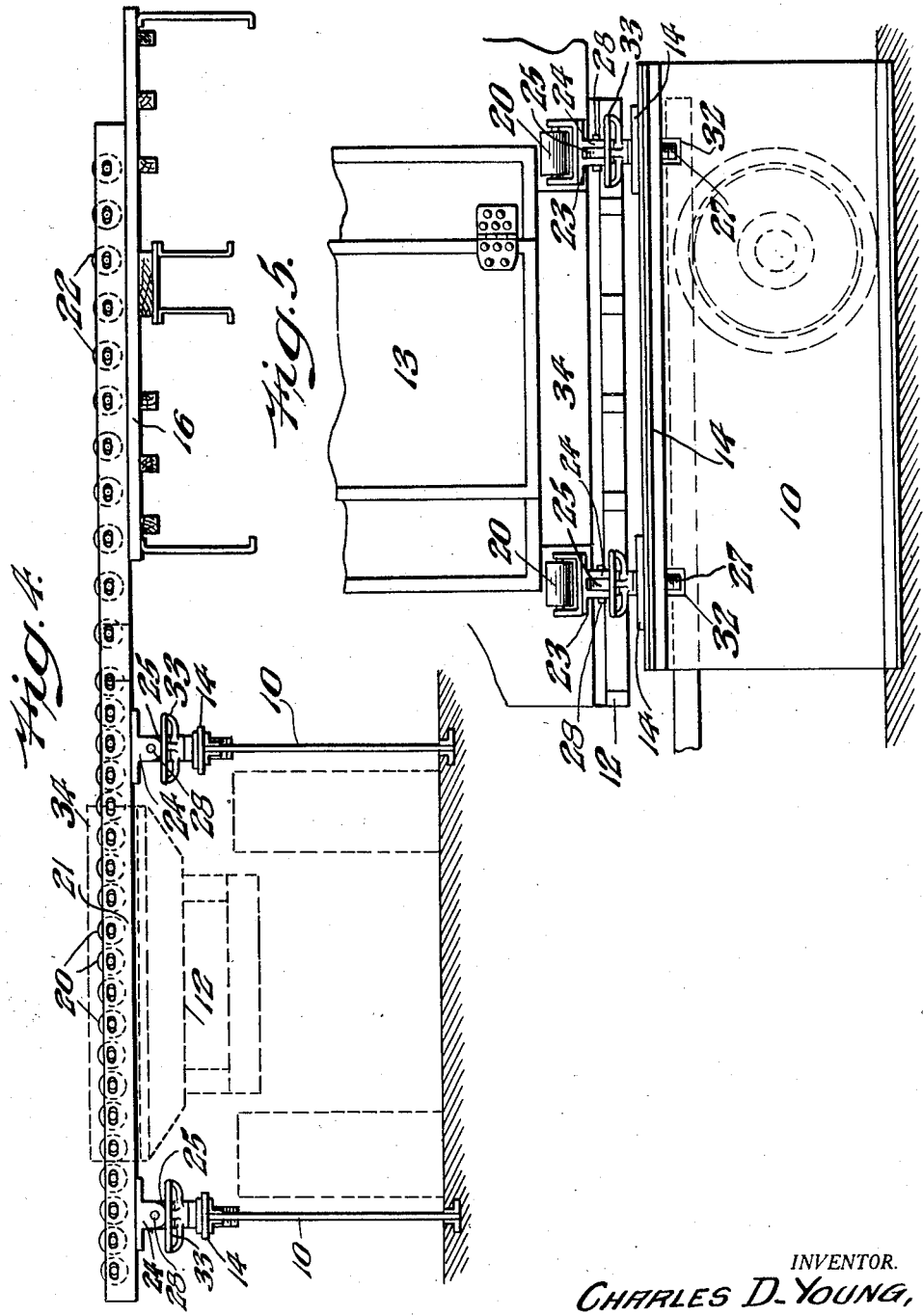
INVENTOR.
CHARLES D. YOUNG,
BY Robert M. Barr
ATTORNEY Patented Dec. 16, 1930

1,785,169

UNITED STATES PATENT OFFICE

CHARLES D. YOUNG, OF WAYNE, PENNSYLVANIA

RAMP-RAIL CONSTRUCTION

Application filed January 18, 1929. Serial No. 333,332.

The present invention relates to the handling of freight containers and more particularly to a ramp construction for that purpose.

Some of the objects of the present invention are to provide an improved ramp rail construction for transferring freight containers to and from a freight car; to provide a ramp construction wherein provision is made for the variation in the height of the floor of different freight cars; to provide means whereby freight containers can be loaded and unloaded at the level of a freight car floor or at the level of a container support upon the floor of such a car; to provide a vertically adjustable ramp track for receiving and delivering freight containers; to provide a ramp construction which can be quickly and easily brought to a predetermined level; and to provide other improvements as will hereinafter appear.

In the accompanying drawings, Fig. 1 represents a side elevation of a ramp construction, embodying one form of the present invention, located in operative relation for receiving and delivering containers from and to a freight car; Fig. 2 represents an end elevation of the same; Fig. 3 represents a section on line 3—3 of Fig. 1; Fig. 4 represents an end elevation of the invention as applied to the loading of containers crosswise of a vehicle; and Fig. 5 represents a side elevation of the same showing a container loaded upon a truck.

Referring to the drawings, one form of the present invention consists of two or more vertically disposed frames 10 mounted upon a suitable foundation, such for example as angle irons 11 embedded in concrete of a driveway, and spaced apart to receive freight carrying vehicles such as motor trucks 12 between them for handling containers 13. The top of each frame 10 supports a bed plate 14 by means of side angle irons 15 and the height of the respective frames 10 is such that the bed plates 14 all lie in the same horizontal plane.

In order to receive a container 13 from a truck 12 or from a freight car, such as a flat car 16, and also to render the transfer of the container from one location to another an easy operation accompanied by a minimum of friction, each bed plate 14 carries a ramp in the form of a yoke 17 which as here shown is of double channel construction for journalling the spindles 18 of two series of track rollers 20, one series extending lengthwise of one channel and the other series extending similarly in the other channel, while the respective rollers 20 of both series lie transversely of the channels with the supporting faces of the rollers above the flanges 21 of the yoke 17. The receiving end "A" of the yoke 17 is curved downwardly so that it terminates below the plane of the bottom of a container 13 when the latter is supported upon a truck 12 while the major body portion of the yoke 17 upon which the container is to rest is substantially horizontal through its length. Thus when a truck carrying a container enters the space between two of the frames 10, the container will meet the inclined ends of the yoke 17 and be automatically raised from the truck as the latter moves into the ramp space and the container will be pushed into position upon the horizontal portion of the yokes where it is entirely removed from the truck. The reverse action can take place by bringing lugs on the truck into engagement with the container to pull the latter forwardly as the truck moves out of the ramp space so that the container rides down the yoke inclines and is deposited upon the truck body.

For the purpose of changing the height of the tracks formed by the rollers 20 so that the discharge ends as well as the body portion will be at the same level as the floor of a freight car, or at the level of loading roller tracks 22 when such are used upon the car, the yoke 17 is supported by a plurality of plates 23 attached at spaced intervals to the bottom thereof, each plate 23 having a pair of ears 24 which straddle a tongue 25 projecting from the head 26 of a feed screw 27. A pin 28 interconnects the ears 24 and tongue 25 to form a pivot whereby one part can rock with respect to another so that one end of the track can be raised or lowered with respect to the other end without strain upon the parts. This rocking movement is facilitated by forming the opposed faces of the associated parts as arcs of circles having the same radius. Each of the feed screws 27 is threaded into a leader nut 30 and passes through a bearing plate 31 on the top of the bed plate 14 into a slot 32 cut in the frame 10. The nuts 30, in the preferred construction, are formed integral with an encircling spider wheel 33 so that rotation of the wheel causes the feed screw 27 to feed axially and vertically by reason of the plate 31 taking the thrust of the nut 30.

It will now be apparent that an efficient ramp construction has been devised for loading and unloading containers both with respect to a motor truck or to a freight car, in the one instance an automatic transfer of the container from a truck to the ramp or from the ramp to a truck, and in the other instance by manual transfer from the ramp to a freight car and vice versa. Since variation in the height of the floor of a flat freight car and a truck are common, the present invention makes it possible to carry out container transfer operations regardless of variation in their floor heights because the ramp roller tracks can be quickly adjusted to any new level required by either having a floor height different from the last vehicle. This adjustment is made by rotating the spider wheels 33 so that the leader nuts 30 are fed in the required direction to bring the ramp tracks to the new level determined by the height of the floor of the car to be loaded or unloaded.

While the present construction illustrates each ramp frame 10 as supporting two roller tracks side by side so that more than one container can be loaded or unloaded simultaneously this is not to be taken as a limitation of the invention as obviously each frame could support but a single roller track and where the loading area will permit but a single pair of the frames 10 this construction will be preferred.

In Figs. 4 and 5 an arrangement of the invention is shown to permit containers having doors to be loaded upon a truck with the doors at the sides of the truck and readily accessible for loading and unloading the containers while the containers are resting upon the truck. In this application of the invention the ramp frames 10 are located parallel to the railroad track and in relatively close proximity thereto for the convenient transfer of the containers from a freight car to the truck or vice versa. The heads 26, in this instance, are set so that the tongues 25 are at right angles to the plane of the frame upon which each is mounted and hence the yoke supporting plates 23 are located to support the ramp rails bridging the space between the frames 10. Thus instead of each frame supporting one ramp rail it supports the ends of two ramp rails with the result a container can be loaded and unloaded from the side of the frames instead of from the ends as heretofore described.

In order that a truck can leave the loading space between the ramp frames 10, the pivot pins 28 for the respective ear and tongue connections are made removable to thereby allow the roller ramp rails to be disconnected and removed from the frame 10 so that they do not obstruct the free passage of a truck. When a container is to be transferred from a freight car or a loading platform to a truck positioned between the frames 10, the ramp rails are fastened in place by seating them on the heads 26 at right angles to the frames 10 across the floor of the truck and fastening them in place by the pins 28. A pair of skids 34, having a height greater than the height of the ramp rails above the truck floor when the ramp rails are in lowest position, are now placed upon the truck floor in proper position to receive the container to be transferred. The receiving position of the ramp rails is such that the bottom of the container is held above the skids by reason of the ramp rail feed screws being in their elevated position, and when the container is over the skids 34 the hand wheels 33 are rotated to lower the container until its rests upon the skids. The ramp rails now being free of the load are disconnected from their supports by the removal of the pins 28 and can be pulled out to allow the truck to drive out with its container. Thus a truck can be loaded with one or more containers all of which have their respective doors at the side of the truck thereby allowing free access to the contents of the containers without removing them from the truck.

Having thus described my invention, I claim:

1. In a container transfer system, a fixed frame, a plurality of feed screws mounted on said frame for movement relative thereto, a ramp rail supported by said feed screws, leader nuts respectively on said feed screws and thrusting against said frame, and means for manually turning said nuts to raise or lower said rail with respect to said frame.

2. In a container transfer system, the combination of two or more frames spaced apart to form vehicle receiving stalls, yokes respectively mounted on said frames and forming track channels, rollers journalled transversely of said channels to form tracks extending lengthwise of said yokes, feed screws secured to said yokes, leader nuts on said screws supported by said frame, and manually operated means for turning said nuts to cause said yokes to raise or lower said tracks.

3. In a container transfer system, the combination of two or more frames spaced apart to form vehicle receiving stalls, leader nuts supported by the respective frames, feed screws threaded in said nuts, a head on each feed screw, a yoke pivotally mounted on the screw head of each frame, roller tracks on the respective yokes, and means to rotate said leader nuts to cause said yokes to raise or lower said tracks.

Signed at Philadelphia, county of Philadelphia, State of Pennsylvania, this 21st day of Dec., 1928.

CHARLES D. YOUNG.